US012612479B2

(12) United States Patent
Monnier

(10) Patent No.: US 12,612,479 B2
(45) Date of Patent: Apr. 28, 2026

(54) CROSS-LINKABLE COMPOSITIONS HAVING A LOW VISCOSITY FOR COATINGS AND MATERIALS WITH A HIGH REFRACTIVE INDEX AND A HIGH HEAT DEFLECTION TEMPERATURE

(71) Applicant: Arkema France, Colombes (FR)

(72) Inventor: Guillaume Monnier, Verneuil en Halatte (FR)

(73) Assignee: Arkema France, Puteaux (FR)

( * ) Notice: Subject to any disclaimer, the term of this patent is extended or adjusted under 35 U.S.C. 154(b) by 1010 days.

(21) Appl. No.: 17/606,093

(22) PCT Filed: Apr. 23, 2020

(86) PCT No.: PCT/EP2020/061344
§ 371 (c)(1),
(2) Date: Oct. 25, 2021

(87) PCT Pub. No.: WO2020/216851
PCT Pub. Date: Oct. 29, 2020

(65) Prior Publication Data
US 2022/0195095 A1     Jun. 23, 2022

(30) Foreign Application Priority Data

Apr. 26, 2019     (FR) ................................. FR19.04426

(51) Int. Cl.
| | |
|---|---|
| *C08F 222/10* | (2006.01) |
| *B33Y 70/00* | (2020.01) |
| *C09D 4/00* | (2006.01) |
| *C09D 135/02* | (2006.01) |
| *G02B 1/04* | (2006.01) |

(52) U.S. Cl.
CPC ........ *C08F 222/1045* (2020.02); *B33Y 70/00* (2014.12); *C09D 4/00* (2013.01); *C09D*

*135/02* (2013.01); *G02B 1/04* (2013.01); *C08F 2800/20* (2013.01); *C08F 2810/20* (2013.01)

(58) Field of Classification Search
CPC ............ C08F 222/1045; C08F 2800/20; C08F 2810/20; C08F 220/20; C08F 220/301; C09D 4/00; C09D 135/02; B33Y 70/00; G02B 1/04; G02B 1/041; B29C 64/129; C08L 33/08; C08L 33/10; C08L 45/00
See application file for complete search history.

(56) References Cited

U.S. PATENT DOCUMENTS

| | | | |
|---|---|---|---|
| 2008/0233417 A1* | 9/2008 | Kuramoto | ................ C08K 5/10 524/356 |
| 2012/0145971 A1 | 6/2012 | Lee et al. | |
| 2015/0057422 A1 | 2/2015 | Kondo et al. | |
| 2016/0185887 A1* | 6/2016 | Jang | ....................... G02B 1/041 252/586 |
| 2018/0171080 A1* | 6/2018 | Namiki | .................... C09J 11/06 |

FOREIGN PATENT DOCUMENTS

| | | | |
|---|---|---|---|
| EP | 2586802 A1 | 5/2013 |
| EP | 2664635 A1 | 11/2013 |
| EP | 2684903 A1 | 1/2014 |
| WO | WO20053512 A1 | 3/2020 |

* cited by examiner

*Primary Examiner* — Jessica M Roswell
(74) *Attorney, Agent, or Firm* — Christopher R. Lewis

(57)     ABSTRACT

The invention relates to a crosslinkable composition which comprises a component a) at least one bisphenolfluoroene diglycidyl ether tetra(meth)acrylate, a component b) at least one diluent from the mono(meth)acrylates of a monoalcohol comprising a biphenyl, cumyl or benzyl structure, and at least one optional component from components c), d) and e). It also relates to its use for coatings or materials, in particular for 3D printed articles for optical applications, as it also relates to the crosslinked composition and to the finished product, in particular the 3D article which results therefrom.

21 Claims, No Drawings

CROSS-LINKABLE COMPOSITIONS HAVING A LOW VISCOSITY FOR COATINGS AND MATERIALS WITH A HIGH REFRACTIVE INDEX AND A HIGH HEAT DEFLECTION TEMPERATURE

CROSS-REFERENCE TO RELATED APPLICATIONS

This application is a U.S. national stage application under 35 U.S.C. § 371 of international application number PCT/EP2020/061344, filed Apr. 23, 2020, which claims priority to French patent application number FR19.04426, filed Apr. 26, 2019.

FIELD OF THE INVENTION

The present invention relates to a crosslinkable, in particular photocrosslinkable, composition (formulation), having a low viscosity when used which is suitable for the preparation of coatings or of 3D materials having a high refractive index (RI) and having a high heat deflection temperature (HDT), in particular suitable for the manufacture of 3D printed objects, more particularly for optical applications.

BACKGROUND OF THE INVENTION

Crosslinkable and in particular photocrosslinkable formulations for optical objects already exist but these are not suitable for the manufacture of optical objects by 3D printing, which requires specific physicochemical properties. There also exist photocrosslinkable formulations for 3D printing but which are not suitable for optical applications or do not meet the performance qualities required for optical applications. There is thus a need for novel compositions for optical applications which can be 3D printed for the preparation of three-dimensional objects (articles). Among the performance qualities required for the 3D printing of optical objects, the crosslinkable compositions of the present invention have to satisfy at least the following important criteria not fulfilled by those known from the state of the art:

- viscosity when used (25° C. being taken as reference temperature) of less than 5000 mPa·s, preferably of less than 3000 mPa·s and more preferably of less than 2500 mPa·s,
- a heat deflection temperature (HOT) according to the ISO 075 (2004) method after crosslinking of at least 70° C. and preferably of at least 80° C.,
- a refractive index (RI) before crosslinking according to the standard ASTM D1218-12(2016) of at least 1.47, preferably of greater than 1.52 and more particularly of greater than 1.56 and, after crosslinking, of at least 1.50, preferably of greater than 1.55 and more particularly of at least 1.57.

More particularly, the crosslinked formulations have to have a Young's modulus at 25° C. according to the ISO 527 (1993) method of at least 2500 MPa, preferably of at least 3000 MPa.

EP 2 586 802 B1 describes a composition which can crosslink under radiation by the radical route suitable for lenses having a high refractive index and comprising, as essential components, a phenylbenzyl (meth)acrylate and an aromatic urethane (meth)acrylate. The presence of any bisphenolfluorene diglycidyl ether tetra(meth)acrylate is neither described nor suggested by this document.

EP 2 664 635 B1 relates to the same field of application as the abovementioned document and describes a composition which can crosslink under radiation by the radical route suitable for lenses having a high refractive index and comprising, as essential components, phenylbenzyl (meth)acrylate with a limited ratio between o- and p-isomers of the benzylphenyl (meth)acrylate, additionally comprising an epoxy (meth)acrylate of aromatic structure. The presence of bisphenolfluorene diglycidyl ether tetra(meth)acrylate is neither described nor suggested by this document either.

EP 2 684 903 B1 describes similar compositions for the same use with the presence of a phenylbenzyl (meth) acrylate component with a specific ratio between o-and p-isomers and the presence of a second (meth) acrylate component comprising, in its structure, biphenyls connected by a methylene, the said composition not comprising urethane (meth) acrylate. The presence of bisphenolfluorene diglycidyl ether tetra (meth) acrylate is neither described nor suggested by this document either.

SUMMARY OF THE INVENTION

The $1^{st}$ subject of the invention thus relates to a crosslinkable composition comprising two essential components a) and b) as defined below and optionally other components c), d), and e) as defined below.

The crosslinked composition also comes within the invention as the finished product resulting from the crosslinking of the said composition or comprising the said crosslinked composition.

Another subject of the invention relates to the use of the said composition for the preparation of coatings and of materials having a high RI and a high HDT.

DETAILED DESCRIPTION OF THE INVENTION

The first subject of the invention therefore relates to a crosslinkable composition (also called formulation for this invention) which comprises:

- a) at least one biphenolfluorene diglycidyl ether tetra (meth)acrylate oligomer,
- b) at least one diluent from mono(meth)acrylates of a monoalcohol comprising a biphenyl, cumyl or benzyl structure,
- c) optionally at least one (meth)acrylate oligomer with a (meth)acrylate functionality of at least two, selected from urethane (meth)acrylates or thiocarbarnate (meth) acrylates,
- d) optionally at least one (meth)acrylate ester monomer with a functionality of from 1 to 6, different from b),
- e) optionally at least one oligomer from polyester (meth) acrylate, polyether (meth)acrylate or epoxy (meth) acrylate with a functionality of from 1 to 15.

As regards the optional components c) to e), they can be present in the said composition either each alone in combination with the components a) and b) as defined above, or in combination with one or more other components from the components c) to e).

The content by weight of each component a) to e) can be defined with respect to the weight of the components a)+b). This content by weight can be converted into % by weight with respect to the total weight of the composition. For example, if the % by weight of the component c) with respect to a)+b) in a composition a)+b)+c) is equal to x, in this case the % by weight X with respect to the total weight of the composition a)+b)+c) can be calculated according the following formula:

$$X = 100x/(100+x)$$

The sum of the % by weight thus calculated of the components present a) and b) and optionally of c) to e), with respect to the total weight of the composition, has to be equal to 100%.

For example, if the content by weight of a), with respect to the weight of a)+b), is 60% and the content by weight of c) in a composition a)+b)+c), with respect to a)+b), is defined as being 30%, in this case the % by weight of c), with respect to the weight of a)+b)+c), will be 100.30/(100+30)=3000/130=23.08% with % of a)=60. 100/100+30=46.15% end the % of b) (complement of a) in 100 parts of a)+b) is 40% vs a)+b)) is 40. 100/130=30.77% with the sum of % a)+b)+c)=23.08+45.15+30.77=100%.

The bisphenolfluorene diglycidyl ether tetra(meth)acrylate as component a) can be prepared by esterification of bisphenolfluorene diglycidyl ether (BFDG) either with (meth)acrylic acid in two stages or in one stage with (meth)acrylic anhydride, with reaction first of the epoxide groups by opening of the oxirane ring, with formation of a first (meth)acrylic ester group and of a secondary hydroxyl group, which after complete (meth)acrylation (vs secondary OH) results in the BFDG tetra(meth)acrylated component. Similar detailed conditions for (meth)acrylation by (meth) acrylic anhydride of a BADGE (bisphenol A diglycidyl ether) for preparing the BADGE tetra(meth)acrylate are already described in U.S. Pat. No. 6,515,166 and can thus be applied to the BFDG derivative.

More particularly, the component a) is the bisphenolfluorene diglycidyl ether tetramethacrylate of formula (I) below:

[Chem 1]

(I)

or bisphenolfluorene diglycidyl ether tetraacrylate, of the same formula (I) except that the methyl group of the methacrylate is absent (all methacrylate groups replaced by acrylate groups).

The complete methacrylation means the complete methacrylation of the terminal glycidyl group, both of the oxirane (epoxy) group of the said glycidyl and also of the secondary hydroxyl group formed after the opening of the said oxirane ring.

As regards the component b), it can be prepared by (meth)acrylation by (meth)acrylic acid or by (meth)acrylic anhydride of a monoalcohol comprising a biphenyl or cumyl or benzyl structure. The monoalcohol may optionally be an alkoxylated, especially ethoxylated and/or propoxylated, derivative. Mention may be made, as examples of a monoalcohol which can be (meth)acrylated to give the mono (meth)acrylate as defined according to b), of biphenyl-4-methanol, biphenyl-2-ol, ethoxylated biphenyl-2-ol (1 or 2 ethoxy units), 4-cumyl phenol, ethoxylated 4-cumyl phenol (1 or 2 ethoxy units) or benzyl alcohol.

More particularly, the said component b) is the biphenyl-4-methanol mono(meth)acrylate of formula (II) below:

[Chem 2]

(II)

with R being methyl or H, preferably H.

It is prepared by the (meth)acrylation of biphenyl-4-methanol.

According to one embodiment, the said component b) corresponds to an ethoxylated biphenyl-2-ol mono(meth) acrylate of formula (III) or (IV):

(III)

-continued (IV)

with R being methyl or H, preferably H.

The said monomer c) is a (meth)acrylate monomer and/or oligomer with a (meth)acrylate functionality of at least two selected from urethane (meth)acrylates or thiocarbamate (meth)acrylates. The said urethane (meth)acrylate oligomers may be reaction products of a polyisocyanate with a mono (meth)acrylate oligomer which carries a hydroxyl group, optionally in the presence of a chain-lengthening diol, or between a diol oligomer with a polyisocyanate in the presence a hydroxyalkyl (meth)acrylate. The said lengthening diols may be C2 to C8 alkylene diols, polyethers diols or polyesters diols. The said thiocarbamate oligomers are obtained analogously to the urethane oligomers, by replacing the diol lengthener with a dithiol lengthener (R—(SH)$_2$), including alkylene dithiol or polythioether dithiols.

The urethane (meth)acrylate oligomers according to c) can be obtained, for example, from a polyisocyanate, a hydroxyalkyl (meth)acrylate with C2-C4 alkyl and an oligomer polyol, in particular oligomer diol, it being possible for the said oligomer to be chosen from polyester polyols, in particular diols, polyether polyols, in particular diols, or alkoxylated alkylene polyols and in particular alkoxylated alkylene diols, or from polycarbonate polyols and in particular diols, more particularly aromatic polycarbonate diols.

The said monomer d) as defined in the composition according to the invention has a (meth)acrylate functionality of from 1 to 6 and it is preferably selected from mono(meth) acrylic esters of C1 to C18 aliphatic alcohols or of C6 to C18 cycloaliphatic alcohols or from polyfunctional (meth)acrylic esters (of functionality 2 to 6) of C2 to C18 polyols, in particular from polyfunctional (meth)acrylic esters of C3 to C18 polyols, or from hydroxyalkyl (meth)acrylates, in particular hydroxy(C2-C6 alkyl) (meth)acrylates, epoxy (meth) acrylates, aminoacrylates and urethane (meth)acrylates and optionally the said monomer d) comprises at least one unit of alkoxy structure.

Mention may be made, as suitable examples of (meth) acrylic monoesters of C1 to C18 aliphatic alcohols, of mono(meth)acrylates of C1 to C18 alkanols, such as methyl, ethyl, propyl, butyl, pentyl, hexyl, heptyl, octyl, 2-ethylhexyl, nonyl, decyl, lauryl or stearyl (meth)acrylate and the (meth)acrylate of all their isomers when several isomers are possible for an alkanol, it being possible for the said alkanol to be alkoxylated with 1 to 5 alkoxy units from ethoxy and/or propoxy. Mention may be made, as (meth)acrylic monoesters of C6 to C18 cycloaliphatic alcohols, of the (meth)acrylate of cyclohexanol and of its derivatives substituted on the C6 ring, isobornyl (meth)acrylate, isophoronyl (meth)acrylate or dicyclopentadienyl (meth)acrylate, it being possible for the said (meth)acrylates to be alkoxylated (starting from alkoxylated cycloalkanols), like the (meth) acrylates of the said alkanols.

Mention may be made, as polyfunctional (meth)acrylic esters of C2 to C18 polyols suitable as component d) of the composition according to the invention, of ethylene glycol di(meth)acrylate, diethylene glycol di(meth)acrylate, triethylene glycol di(meth)acrylate, propylene glycol di(meth) acrylate, dipropylene glycol di(meth)acrylate, butylene glycol di(meth)acrylate, pentanediol di(meth)acrylate, neopentyl glycol di(meth)acrylate, hexanediol di(meth)acrylate, cyclohexanediol di(meth)acrylate, tricyclodecanedimethanol di(meth)acrylate, glycerol tri(meth)acrylate, trimethylolpropane tri(meth)acrylate, di(trimethylolpropane) ether tetra(meth)acrylate, pentaerythritol tetra(meth)acrylate or di(pentaerythritol) ether hexa(meth)acrylate.

Mention may be made, as hydroxyalkyl (meth)acrylate monomers suitable as component d), of the monohydroxy (meth)acrylic esters of polyols with an OH functionality at the start ranging from 2 to 6 and more particularly of 2. In the case of diols, they are monohydroxy (meth)acrylic monoesters. In the case of polyols with a functionality of greater than 2 (3 to 6), the said monohydroxy (meth)acrylic esters can comprise, in addition to the hydroxyl functional group, from 2 to 5 (meth)acrylate functional groups for one hydroxyl functional group. Preferably, the said hydroxyalkyl (meth)acrylates are monohydroxy (meth)acrylic monoesters of a C2 to C6 alkylene diol and more preferably they are hydroxyethyl (meth)acrylate, hydroxypropyl(meth)acrylate or hydroxybutyl (meth)acrylate.

Another specific category of (meth)acrylic monomers with a functionality of 1 to 6 which may be suitable as monomer d) in the composition according to the invention is the category of epoxy (meth)acrylates. These monomers, if they are not alkoxylated, can be prepared by the esterification by (meth)acrylic acid of an epoxidized precursor compound of the epoxy (meth)acrylate monomer targeted, with the said epoxidized precursor having a functionality of epoxy (oxirane) groups which is identical to the functionality of (meth)acrylates of the epoxy (meth)acrylate monomer targeted. Such a (meth)acrylation with opening of the oxirane ring results in a (meth)acrylic ester group and a secondary OH group for each oxirane group which has reacted. In the case of alkoxylated epoxy (meth)acrylates, the alkoxylation is carried out directly on the epoxidized compound with formation of an ether bridge between the terminal oxirane of the epoxidized compound and the alkylene oxide (ethylene oxide and/or propylene oxide) used as alkoxylating agent, resulting, for a diepoxidized epoxidized precursor, such as bisphenol A diglycidyl ether, in an alkoxylated diol of the bisphenol A diglycidyl ether, which can be (meth)acrylated by esterification with (meth)acrylic acid, obtaining, in the case of the alkoxylated derivative of bisphenol A diglycidyl ether, the alkoxylated di(meth)acrylate of bisphenol A diglycidyl ether (for example with 1 to 10 ethoxy and/or propoxy units).

As other monomers suitable as component d) in the composition according to the invention as defined above, there is the category of the aminoacrylates with a functionality ranging from 1 to 5. These monomers comprise an aminoacrylate =N—CH2-CH2 group which results from the Michael reaction by addition of an =NH group of an amine to a polyfunctional acrylate monomer with a functionality ranging from 2 to 6 with the amine =NH groups being in deficit with respect to the acrylate groups, so that there is at least one acrylate group per molecule of starting polyfunctional acrylate not saturated by the said amine groups. The amine used is preferably a monoamine and in particular a secondary amine, which can comprise a tertiary amine group (non-reactive by Michael addition).

Another category of monomers which are suitable as monomer d) in the composition according to the invention is the category of the urethane (meth)acrylate monomers. These are monomers which result from the reaction of an aliphatic, cycloaliphatic or aromatic monoisocyanate or polyisocyanate with hydroxyalkyl (meth)acrylates, preferably with the said alkyl being a C2 to C6 alkyl. According to a specific option of the composition according to the invention, the said monomer d) comprises one or more alkoxy units, preferably chosen from ethoxy, propoxy or butoxy or from their mixtures.

As regards the said oligomer e), which is a polyester (meth)acrylate, polyether (meth)acrylate or epoxy (meth) acrylate, it can have a (meth)acrylate functionality ranging from 1 to 15 or from 1 to 10. The said oligomer has a number-average molecular mass Mn which is greater than 600 and preferably of at least 800, more preferably of at least 1000. The Mn is determined by GPC as polystyrene equivalents in THF.

The polyester (meth)acrylates according to e) are obtained from the partial or complete (meth)acrylation of polyester polyols (with corresponding functionality of OH making possible the final (meth)acrylate functionality after (meth) acrylation) which result from the polycondensation of a polyol with a polyacid with removal of the water of esterification. In particular, the polyester diols result from the polycondensation of a diacid. The polyester diols can also result from the polymerization of a cyclic lactone, such as caprolactone. They can be of aliphatic, cycloaliphatic or aromatic structure or of mixed structure, according to the structure of the diacid and diol precursor components.

The polyether (meth)acrylates according to e) result from the (meth)acrylation of polyether polyols (having a suitable OH functionality making possible the targeted final (meth) acrylate functionality). The polyether polyol oligomers which can be used for this (meth)acrylation can be polyoxyethylene polyols, polyoxypropylene polyols, polyoxyethylene-polyoxypropylene random or block copolymers or polyoxytetramethylenes (polytetrahydrofurans or poly-THFs).

The epoxy (meth)acrylate oligomers are obtained by reaction of a mono- or polyepoxidized oligomer with (meth) acrylic acid. Mention may be made, as examples, of: BADGE (bisphenol A diglycidyl ether) di(meth)acrylate.

The composition according to the invention has a content by weight of the component a), with respect to the weight a)+b), which can vary from 20% to 80% and preferably from 35% to 65%.

As regards the content by weight of the said component c), with respect to the weight a)+b), it can vary from 0% to 50% and preferably from 5% to 35%.

As regards the content by weight of the component d), with respect to the weight a)+b), can vary from 0% to 50% and preferably from 5% to 35%.

As regards the content by weight of the component e), with respect to the weight a)+b), it can vary from 0% to 50% or from 0% to 40% and preferably from 5% to 30% or from 10% to 30%.

The percentage by weight of the component a) with respect to the weight of the composition may range from 1% to 50%, or 2% to 40%, or 5% to 30% or 10% to 20%.

The percentage by weight of the component b) with respect to the weight of the composition may range from 1% to 50%, or 2% to 40%, or 5% to 30% or 10% to 20%.

The total percentage by weight of the components a)+b), with respect to the weight of the composition, may range from 5% to 90%, or 10% to 80%, or 15% to 70% or 20% to 60%.

The percentage by weight of the component c) witch respect to the weight of the composition may range from 0% to 50%, or 1% to 40%, or 5% to 30% or 10% to 20%.

The percentage by weight of the component d) with respect to the weight of the composition may range from 0% to 50%, or 1% to 40%, or 5% to 30% or 10% to 20%.

The percentage by weight of the component e) with respect to the weight of the composition may range from 0% to 50%, or 1% to 40%, or 5% to 30% or 10% to 20%.

According to a specific option, the composition according to the invention can comprise, in addition to a) and b) and optionally c) to e), at least one initiator.

The said initiator can be selected from a peroxide or hydroperoxide and, in this case, the said composition of the invention can be crosslinked by the thermal route or at low temperature in the presence of a reducing accelerator of the said peroxide or hydroperoxide. Use may be made, as reducing accelerator of the said peroxide or hydroperoxide which accelerates its decomposition at low temperature (in particular at ambient temperature: 15-25° C.), of a tertiary amine.

In an alternative option, the composition of the present invention can comprise an initiator which is at least one photoinitiator and, in this case, the said composition according to the invention can be crosslinked by UV radiation, including near UV/visible radiation, preferably by a UV/visible or near UV/visible lamp, by laser or by LED, preferably a near UV/visible lamp. The range of the wavelengths which corresponds to the near UV/visible radiation ranges from 355 to 415 nm and that which corresponds to the UV/visible ranges from 400 to 800 nm.

According to another alternative option, the composition according to the invention does not comprise any initiator and, in this case, it can be crosslinked only by EB radiation (that is to say, by an electron beam).

According to another alternative, the composition of the invention can be crosslinked by a dual route, which means that it combines at least two crosslinking techniques as defined above as other alternative routes. The two crosslinking techniques may be selected from:

crosslinking by the thermal route, using as initiator a peroxide or hydroperoxide in the presence of a reducing accelerator of the said peroxide or hydroperoxide, crosslinking by UV radiation (including near-UV/visible radiation, preferably by UV/visible or near-UV/visible lamp), or laser or LED radiation, using as initiator a photoinitiator, and crosslinking by EB radiation (with an electron beam).

Mention may be made, as examples of dual routes under this alternative definition, of the combination of a route based on the presence of a peroxide/hydroperoxide with that where at least one photoinitiator is present. In such a case, the composition can be crosslinked either simultaneously or in successive stages by the thermal route or at low temperature in the presence of peroxide/hydroperoxide and by the route under UV radiation with the additional presence of a photoinitiator. For example, a rapid crosslinking by the UV route in the presence of a photoinitiator can be followed by an additional crosslinking by the thermal route as a result of the presence of a peroxide/hydroperoxide with the said photoinitiator, thus making it possible to round off/complete the crosslinking, in particular at a temperature greater than that of the UV crosslinking. This can in particular be advantageous when the glass transition temperature of the completely crosslinked composition is greater than that of the UV crosslinking temperature.

Mention may in particular be made, as examples of suitable peroxides, of: dialkyl, diaryl and aryl/alkyl peroxides, hydroperoxides, percarbonates, peresters, peracids and acyl oxides.

Mention may in particular be made, as examples of decomposition (reducing) accelerators of peroxides or hydroperoxides, of: tertiary amines and/or one or more reducing agents containing transition metal salts, such as iron, cobalt, manganese or vanadium carboxylates.

Mention may in particular be made, as examples of suitable photoinitiators, of derivatives of: benzoins, benzoin ethers, acetophenones, benzils, benzil ketals, anthraquinones, acylphosphine oxides, α-hydroxyketones, phenylglyoxylates, α-aminoketones, benzophenones, thioxanthones, xanthones, quinoxaline derivatives and triazine compounds.

Mention may in particular be made, as examples of particularly suitable radical photoinitiators, of: 2-methylanthraquinone, 2-ethylanthraquinone, 2-chloroanthraquinone, 2-benzylanthraquinone, 2-(t-butyl)anthraquinone, 1,2-benzo-9,10-anthraquinone, benzils, benzoins, benzoin ethers, benzoin methyl ether, benzoin ethyl ether, benzoin isopropyl ether, α-methylbenzoin, α-phenylbenzoin, Michler's ketones, acetophenones, such as 2,2-diolkoxybenzophenones and 1-hydroxyphenyl ketone, benzophenone, 4,4'-bis(diethylamino)benzophenone, acetophenone, 2,2-diethyloxyacetophenone, diethyloxyacetophenone, 2-isopropylthioxanthone, thioxanthone, diethylthioxanthone, 1,5-acetonaphthylene, ethyl p-dimethylaminobenzoate, benzyl ketone, (2,4,6-trimethylbenzoyl)diphenylphosphine oxide, benzil dimethyl ketal, 2,2-dimethoxy-1,2-diphenylethanone, 1-hydroxycyclohexyl phenyl ketone, 2-methyl-1-[4-(methylthio)phenyl]-2-morpholinopropan-1-one, 2-hydroxy-2-methyl-1-phenylpropanone, oligomeric α-hydroxy ketone, benzoylphosphine oxides, phenylbis(2,4,6-trimethylbenzoyl)phosphine oxide, ethyl 4-(dimethylamino)benzoate, ethyl (2,4,6-trimethylbenzoyl)phenylphosphinate, anthraquinone, (benzene)tricarbonylchromium, benzil, benzoin isobutyl ether, 3,3',4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone, 3,4-dimethylbenzophenone, 4'-ethoxyacetophenone, (2,4,6-trimethylbenzoyl)diphenylphosphine oxide, phenylbis(2,4,6-trimethylbenzoyl)phosphine oxide, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methylbenzoyl formate, 2-methyl-4'-(methylthio)-2-morpholinopropiophenone, phenanthrenequinone, 4'-phenoxyacetophenone, (cumene)cyclopentadienyliron(II) hexafluorophosphate, 9,10-diethoxy- and 9,10-dibutoxyanthracene, 2-ethyl-9,10-dimethoxyanthracene, thioxanthen-9-one or any combination of the abovementioned initiators. Preferably, the composition according to the invention has a viscosity at 25° C. according to the ISO 3219 (1993) method of less than 5000 mPa·s and preferably of less than 3000 mPa·s and more preferably of less than 2500 mPa·s. More particularly, after crosslinking, it has an HDT according to the ISO 075 (2004) method of at least 70° C. and preferably of greater than 80° C. In particular, after crosslinking, it has a Young's modulus at 25° C. according to the ISO 527 (1993) method of at least 2500 MPa, preferably of at least 3000 MPa.

Preferably, the composition according to the invention has an RI before crosslinking according to the ASTM D1218-12(2016) standard of at least 1.47, preferably of greater than 1.52 and more particularly of greater than 1.56 and, after crosslinking, of at least 1.50 and preferably of greater than 1.55 and more particularly of at least 1.57.

A second subject of the invention relates to the use of a composition according to the invention for the preparation of coatings or of materials having an HDT according to the ISO 075 (2004) method of at least 70° C. and preferably of greater than 80° C. and/or an RI of at least 1.50, preferably of greater than 1.55 and more particularly of greater than 1.57.

More particularly, the said use relates to materials which are either 3D printed articles or materials different from 3D printed articles. The term "materials different from 3D printed articles" means in this instance materials for injection/moulding processes (by definition, not printed). This is because the crosslinkable compositions according to the invention, apart from 3D printing, which is targeted in particular, are also suitable for the preparation of 3D objects (articles) by other methods, such as, for example, moulding.

According to a preferred option, the said use relates to 3D printed articles. These 3D printed articles can be printed by different processes, in particular by a layer-by-layer printing process or by a continuous process.

A "layer-by-layer" 3D printing process comprises the following stages:
a) depositing, on a surface, a first layer of crosslinkable composition according to the invention,
b) crosslinking the said first layer, at least partially, in order to obtain a first crosslinked layer,
c) depositing, on the said first crosslinked layer, a second layer of crosslinkable composition according to the invention,
d) crosslinking the said second layer, at least partially, in order to obtain a second crosslinked layer, which is stuck to the first crosslinked layer; and
e) repeating stages c) and d) the number of times necessary in order to obtain the final 3D (or three-dimensional) article.

The crosslinking routes which can be used are those already described above with a particular preference for the techniques for crosslinking under actinic radiation (UV, UV/visible, near UV/visible or under an electron beam EB).

The crosslinkable composition of the present invention can also be used in processes for the production of three-dimensional (3D) objects (articles) by a continuous process also known as a CLIP (Continuous Liquid Interface (or Interphase) Product (or Printing)) method or process. This type of process is described in WO 2014/126830, WO 2014/126834 and WO 2014/126837 and in Tumbleston et al., "Continuous Liquid Interface Production of 3D Objects", Science, Vol. 347, Issue 6228, pp. 1349-1352 (Mar. 20, 2015).

The CLIP process proceeds by projection of a film or of a continuous sequence of images by actinic radiation, for example UV radiation, which images can be generated, for example, by a digital imaging unit, through a window transparent to the said actinic radiation and permeable to oxygen (inhibitor), located under a bath of the crosslinkable (curable) composition maintained in liquid form. A liquid interface below the (growing) article is maintained by the dead zone created above the window. The cured solid article is continuously extracted from the bath of crosslinkable composition above the dead zone, which can be regenerated by introducing, into the bath, additional amounts of the crosslinkable composition in order to compensate for the amounts of crosslinkable composition which are cured and incorporated in the growing article.

For example, a process for printing a three-dimensional article using the crosslinkable composition of the invention can comprise the following stages:

a) providing a substrate (or print platen) and an optically transparent element having a construction surface, the substrate and the construction surface defining, between them, a construction region, b) filling the said construction region with the crosslinkable composition according to the invention, c) continuously or intermittently irradiating the said construction region with actinic radiation, in order to form, starting from the crosslinkable composition, a crosslinked composition, and d) continuously or intermittently, moving the said substrate away from the construction surface in order to form the three-dimensional (3D) article with the crosslinked composition.

More particularly, the continuous printing process (CLIP type) can comprise the following stages: (a) providing a substrate (or print platen) and a stationary construction window, the construction window comprising a semi-permeable element, the said semi-permeable element comprising a construction surface and a feed surface separated from the construction surface with the said construction surface and the said substrate (or print platen) defining, between them, a construction region and with the feed surface in liquid contact with a polymerization inhibitor, (b) subsequently and at the same time and/or sequentially, filling the construction region with a crosslinkable composition according to the invention with the said composition being in contact with the print platen, (c) irradiating the construction region through the construction window in order to produce a solid polymerized region in the construction region with a remaining layer of liquid film consisting of the curable composition, formed between the solid polymerized region and the construction window, the polymerization of the liquid film being inhibited by the polymerization inhibitor, and (d) moving the print platen, to which the polymerized region is stuck, away from the construction surface of the stationary window in order to create a construction region between the polymerized region and the stationary construction window. Generally, the process includes stage (e), the repetition and/or the continuation of the stages from (b) to (d), in order to subsequently produce a polymerized region stuck to a region polymerized previously, until the continuous or repeated deposition of polymerized regions stuck to one another forms the targeted three-dimensional article.

The printed 3D articles obtained by the use of the crosslinkable (curable) composition according to the invention have, in particular, for the optical applications, a refractive index RI of at least 1.50, preferably of greater than 1.55 and more particularly of at least 1.57.

More particularly, the optical appiications targeted are for: plastic lenses, in particular lenses for ophthalmic glasses, lenses for digital cameras or lenses for optical prisms, or optical coatings among optical overcoatings, hard optical coatings or anti-reflective films or for coating of LEDs or of solar (photovoltaic) cells, or optical fibres, holograms, lenses for prisms and LED materials.

Another subject also coming within the present invention relates to a crosslinked composition, which results from the crosslinking of at least one composition as defined above according to the invention.

Finally, the present invention also covers a finished product, which results from the crosslinking of at least one composition as defined according to the invention or which comprises at least one crosslinked composition as defined above.

The said finished product is in particular a coating, a moulded material, for example a composite material, or a 3D printed article.

More particularly, the said finished product is a 3D printed article and is preferably selected from: plastic lenses, in particular lenses for ophthalmic glasses, lenses for digital cameras or lenses for optical prisms, or optical coatings among optical overcoatings, hard optical coatings or anti-reflective films or for coating of LEDs or of solar (photovoltaic) cells, or optical fibres, holograms, lenses for prisms and LED materials.

The following examples are given by way of illustration of the invention and of its performance qualities and do not in any way limit its scope, the latter being defined by the claims.

EXAMPLES

1) Formulations

The formulations of examples 1 to 6, containing biphenylfluorene diglycidyl ether tetramethacrylate, are prepared with the compounds described below, in the proportions indicated in Table 1 (% by weight with respect to the weight of the formulation):

Compound A: biphenylfluorene diglycidyl ether tetramethacrylate

Biphenylfluorene diglycidyl ether tetramethacrylate is prepared according to the same conditions described in U.S. Pat. No. 6,515,166 for preparing bisphenol A diglycidyl ether tetramethacrylate from bisphenol A diglycidyl ether, and these conditions are applied here to biphenylfluorene diglycidyl ether to give biphenylfluorene diglycidyl ether tetramethacrylate.

Compound B: H008 from KPX Green Chemical, biphenyl-4-methanol acrylate

Compound C: A011 from KPX Green Chemical, ethoxylated biphenyl-2-ol acrylate (1 EO)

Compound D: A003M from KPX Green Chemical, benzyl methacrylate

Compound E: CD590 from Sartomer, 4-cumylphenol acrylate

Compound F: HPMA from Evonik, hydroxypropyl methacrylate

Compound G: SR340 from Sartomer, 2-phenoxyethyl methacrylate

TABLE 1

| Compound | Example 1 | Example 2 | Example 3 | Example 4 | Example 5 | Example 6 |
|---|---|---|---|---|---|---|
| A | 51.0 | 64.0 | 48.0 | 46.0 | 50 | 50 |
| B | 9.0 | / | / | / | / | / |
| C | / | / | 35.0 | 32.5 | 23.5 | 27.5 |
| D | / | 20.0 | / | / | 14.0 | / |
| E | 25.0 | 16.0 | 12.0 | 11.5 | 12.5 | 12.5 |
| F | 15.0 | / | 5.0 | 10.0 | / | / |
| G | / | / | / | / | / | 10.0 |
| Total: | 100.0 | 100.0 | 100.0 | 100.0 | 100.0 | 100.0 |

Characteristics of the Liquid Formulations Before Cross-linking

To characterize the liquid formulations, measurements of viscosity and refractive index are carried out under the following conditions:

Brookfield viscosity: the viscosity was measured at 25° C. on a Brookfield DVII+ PRO viscometer according to the ISO 3219 (1993) standard Refractive index: the refractive index is measured on a BELLINGHAM+STANLEY RPM 960-T refractometer at 25° C. according to the ASTM D1218-12(2016) standard.

The results are presented in Table 2 below.

Characteristics of the liquid formulations of Examples 1 to 6

TABLE 2

| | Example 1 | Example 2 | Example 3 | Example 4 | Example 5 | Example 6 |
|---|---|---|---|---|---|---|
| Refractive index | 1.563 | 1.563 | 1.569 | 1.562 | 1.570 | 1.569 |
| Brookfield viscosity @ 25° C. (mPa · s) | 2270 | 4200 | 4000 | 2050 | 1880 | 4800 |

3) Physicochemical Characteristics After Crosslinking

Samples

The samples are prepared starting from silicone moulds. The bars (DMA, HDT) have the dimensions, in mm, of 80*10*4 and the test specimens of 5A type for the tensile testing have a thickness of 4 mm. The photoinitiator system is TPO-L (ethyl (2,4,6-trimethylbenzoyl)phenylphosphinate), 2% for all the formulas, and the crosslinking is carried out under a 100% UV bench LED lamp, followed by a post-cure at 80° C. for 12 hours.

Analytical Conditions

Tests carried out at 23° C. under a relative humidity (RH) of 50%.

DMA Analysis

The DMA analysis is carried out on an RDAIII instrument (Rheometrics), in rectangular torsion, with a sweep from −50° C. to 200° C., at 3° C./min, and with a nominal strain of 0.05% and a frequency of 1 Hz. The transition temperature Tα is determined as being the temperature at the summit of the tan delta peak.

HDT:

The HDT (Heat Deflection Temperature) tests are carried out on the HDT instrument (EDIT) according to the ISO 076 (2004) standard. Method A is used (1.8 MPa); the test specimen (thickness of 4 mm) is positioned flat on the substrate (distance between supports=64 mm). The heating rate is 120° C./h.

Tensile Test:

The tensile tests are carried out on an MTS tensile testing device with 500 N cell according to the ISO 527 (1993) standard. The test specimens used are of 5A type. The pull rate is 1 mm/min and then 10 mm/min starting from 7% elongation. Determinations are made of the stress, the elongation at break and the Young's modulus.

Results

The results of the mechanical and thermomechanical tests carried out on the solid samples of the formulations of examples 1 to 6 rare given in Table 3 below.

Mechanical and thermomechanical performance qualifies of the formulations of examples 1 to 6

TABLE 3

| | Example 1 | Example 2 | Example 3 | Example 4 | Example 5 | Example 6 |
|---|---|---|---|---|---|---|
| DMA (° C.) | 154 | 163 | 137 | 134 | 133 | 137 |
| HDT (° C.) | 109 | 140 | 83 | 99 | 103 | 89 |
| Tensile test | | | | | | |
| Stress (MPa) | 30 | 19 | 26 | 13 | 12 | 20 |
| Elongation at break (%) | 1.5 | 1.3 | 1.2 | 1.0 | 1.0 | 1.2 |
| Young's modulus (MPa) | 3200 | 3100 | 3200 | 3100 | 3000 | 3900 |

The invention claimed is:

1. A crosslinkable composition comprising:
a) at least one biphenylfluorene diglycidyl ether tetra (meth) acrylate oligomer of formula (I) below:

(I)

or the bisphenolfluorene diglycidyl ether tetraacrylate of the same formula (I) except that the methyl group of the methacrylate is absent, with all of the methacrylate groups being replaced by acrylate groups,
b) at least one diluent from mono (meth) acrylates of an optionally alkoxylated monoalcohol selected from biphenyl-4-methanol, biphenyl-2-ol, 4-cumyl phenol or benzyl alcohol,
c) optionally at least one (meth) acrylate oligomer with a (meth) acrylate functionality of at least 2, selected from urethane (meth) acrylates or thiocarbamate (meth) acrylates,
d) optionally at least one (meth) acrylate ester monomer or urethane (meth) acrylate monomer with a functionality of from 1 to 6, different from b),
e) optionally at least one oligomer from polyester (meth) acrylate, polyether (meth) acrylate or epoxy (meth) acrylate with a functionality of from 1 to 15,
wherein the content by weight of component a), with respect to the weight a)+b), is from 20% to 80%.

2. The composition according to claim 1, wherein said monomer d) is included and is selected from mono (meth) acrylic esters of C1 to C18 aliphatic alcohols or of C6 to C18 cycloaliphatic alcohols or from polyfunctional (meth)

15 acrylic esters of functionality of from 2 to 6 of C2 to C18 polyols, or from hydroxyalkyl (meth) acrylates, and optionally the monomer d) comprises at least one unit of alkoxy structure.

3. The composition according to claim 1, wherein said oligomer e) is included and is selected from polyester (meth) acrylate or polyether (meth) acrylate or epoxy (meth) acrylate and has a (meth) acrylate functionality of from 1 to 10.

4. The composition according to claim 1, wherein the component b) is 4-cumyl phenol acrylate.

5. The composition according to claim 1, wherein the content by weight of d), with respect to the weight a)+b), is from 5% to 50%.

6. The composition according to claim 1, wherein the content by weight of e), with respect to the weight a)+b), is from 5% to 50%.

7. The composition according to claim 1 further comprising at least one initiator.

8. The composition according to claim 7, wherein the at least one initiator is selected from a peroxide or hydroperoxide and can be crosslinked by the thermal route or at low temperature in the presence of a reducing accelerator of the peroxide or hydroperoxide.

9. The composition according to claim 7, wherein the at least one initiator is at least one photoinitiator and can be crosslinked by UV radiation, by laser or by LED.

10. The composition according to claim 1, wherein the composition does not comprise any initiator and can be crosslinked by EB (electron beam) radiation.

11. The composition according to claim 1, wherein the composition can be crosslinked by a dual route combining at least two crosslinking techniques selected from crosslinking by the thermal route, using as initiator a peroxide or hydroperoxide in the presence of a reducing accelerator of the peroxide or hydroperoxide, crosslinking by UV radiation, laser or LED, using as initiator a photoinitiator, and crosslinking by radiation by electron beam.

12. The composition according to claim 1, wherein the composition has a viscosity at 25° C. according to the ISO 3219 (1993) method of less than 5000 mPa·s.

13. The composition according to claim 1, wherein, after crosslinking provides a crosslinked composition, the crosslinked composition has an HDT according to the ISO 075 (2004) method of at least 70° C.

14. The composition according to claim 1, wherein, after crosslinking provides a crosslinked composition, the crosslinked composition has a Young's modulus at 25° C. according to the ISO 527 (1993) method of at least 2500 MPa.

15. The composition according to claim 1, wherein the composition has an RI before crosslinking according to the ASTM D1218-12 (2016) standard of at least 1.47 and, after crosslinking provides a crosslinked composition, the crosslinked composition has an RI of at least 1.50.

16. A method of making a coating comprising crosslinking a composition according to claim 1, wherein the coating has at least one of an HDT according to the ISO 075 (2004) method of at least 70° C. or an RI of at least 1.50.

17. A 3D printed article made by crosslinking the composition according to claim 1.

18. A 3D printed article according to claim 17, wherein the 3D printed article is printed by a layer-by-layer printing process or by a continuous process.

19. A 3D printed article according to claim 17 having a refractive index RI of at least 1.50.

20. An article or material made by crosslinking the composition according to claim 1, relating to optical applications and suitable for use as one of:

1 plastic lenses, or optical coatings, or optical fibres, holograms, lenses for prisms and LED materials.

21. A crosslinked composition, resulting from crosslinking the composition according to claim 1.

* * * * *